(12) United States Patent
Choi

(10) Patent No.: US 12,056,333 B2
(45) Date of Patent: Aug. 6, 2024

(54) MOBILE TERMINAL FOR SETTING UP HOME SCREEN AND CONTROL METHOD THEREFOR

(71) Applicant: LG ELECTRONICS INC., Seoul (KR)

(72) Inventor: Song Ah Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 260 days.

(21) Appl. No.: 17/640,968

(22) PCT Filed: Sep. 11, 2019

(86) PCT No.: PCT/KR2019/011812
§ 371 (c)(1),
(2) Date: Mar. 7, 2022

(87) PCT Pub. No.: WO2021/049685
PCT Pub. Date: Mar. 18, 2021

(65) Prior Publication Data
US 2022/0357823 A1    Nov. 10, 2022

(51) Int. Cl.
*G06F 3/0484* (2022.01)
*G06F 3/04817* (2022.01)
*G06F 3/0488* (2022.01)
*G06F 3/04886* (2022.01)

(52) U.S. Cl.
CPC ........ *G06F 3/0484* (2013.01); *G06F 3/04817* (2013.01); *G06F 3/0488* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| 8,743,021 | B1 * | 6/2014 | Park | G06F 3/013 |
| | | | | 345/1.3 |
| 10,320,962 | B1 | 6/2019 | Chang | |
| 11,025,770 | B2 * | 6/2021 | Kwon | G06F 1/1643 |

(Continued)

FOREIGN PATENT DOCUMENTS

| KR | 10-2012-0035772 A | 4/2012 |
| KR | 10-2012-0102115 A | 9/2012 |
| KR | 10-2017-0093658 A | 8/2017 |

*Primary Examiner* — Ryan Barrett
(74) *Attorney, Agent, or Firm* — Birch, Stewart, Kolasch & Birch, LLP

(57) ABSTRACT

Disclosed is an electronic device for setting up home screens of a first display and a second display including a database in which information on a first home screen displayed on the first display and information on a second home screen displayed on the second display are stored, and a controller that receives an input to enter a setting control mode for controlling settings of the home screens, acquires the information on the first home screen and the second home screen from the database in response to the input being received, and provides, through the first display, the information on the first home screen and the information on the second home screen in the setting control mode, wherein the first home screen is displayed on the first display by a first application and the second home screen is displayed on the first display by a second application.

14 Claims, 14 Drawing Sheets

(56) References Cited

U.S. PATENT DOCUMENTS

| | | | |
|---|---|---|---|
| 2010/0223563 A1* | 9/2010 | Green | G06F 3/0481 |
| | | | 709/221 |
| 2010/0227642 A1 | 9/2010 | Kim et al. | |
| 2011/0061010 A1* | 3/2011 | Wasko | G06F 3/065 |
| | | | 715/835 |
| 2011/0143769 A1 | 6/2011 | Jones et al. | |
| 2012/0084714 A1* | 4/2012 | Sirpal | G06F 3/0412 |
| | | | 715/790 |
| 2012/0088548 A1* | 4/2012 | Yun | G08C 23/04 |
| | | | 455/557 |
| 2012/0088549 A1* | 4/2012 | Yun | H04N 21/4586 |
| | | | 455/566 |
| 2013/0321340 A1* | 12/2013 | Seo | H04M 1/724 |
| | | | 345/174 |
| 2014/0075377 A1* | 3/2014 | Kang | H04M 1/72409 |
| | | | 715/788 |
| 2014/0203999 A1* | 7/2014 | Shim | G06F 3/0483 |
| | | | 345/2.2 |
| 2014/0344862 A1* | 11/2014 | Cho | H04N 21/42209 |
| | | | 725/46 |
| 2015/0026615 A1* | 1/2015 | Choi | G06F 3/0484 |
| | | | 715/765 |
| 2016/0196048 A1* | 7/2016 | Khoury | H04N 21/4312 |
| | | | 715/761 |
| 2017/0060518 A1* | 3/2017 | Hong | G06F 3/0482 |
| 2017/0344329 A1* | 11/2017 | Oh | H04W 88/02 |
| 2018/0081538 A1* | 3/2018 | Kim | G06F 3/04883 |
| 2019/0012008 A1* | 1/2019 | Yoon | G06F 1/1652 |
| 2020/0371648 A1* | 11/2020 | Huang | H04M 1/72472 |
| 2021/0173533 A1 | 6/2021 | Kim et al. | |

* cited by examiner (a)

(b)

MOBILE TERMINAL FOR SETTING UP HOME SCREEN AND CONTROL METHOD THEREFOR

CROSS REFERENCE TO RELATED APPLICATIONS

This application is the National Phase of PCT International Application No. PCT/KR2019/011812, filed on Sep. 11, 2019, all of which is hereby expressly incorporated by reference into the present application.

TECHNICAL FIELD

This disclosure relates to a mobile terminal for setting up each home screen of a plurality of displays through one of the displays, and a control method thereof.

BACKGROUND ART

With the development of electronic technology, electronic devices such as smartphones that can provide users with various multimedia contents such as videos and photos have been widely distributed.

Recently, the consumption of such multimedia content has been rapidly increasing, and in response thereto, the needs of users who want to view multimedia content in a more comfortable environment are also increasing. Accordingly, the development of an electronic device providing a larger display is being actively conducted.

To provide the larger display, an electronic device having a plurality of displays has emerged. The electronic device having a plurality of displays may include a home screen for each of the displays.

Here, the home screen may refer to at least one basic wallpaper provided by the electronic device. On the home screen, an icon, a widget for executing an application may be arranged. According to the user's settings, the home screen may be implemented in various ways.

For setting up the home screen, the electronic device may provide a setting control mode of the home screen. In the case of the electronic device including the plurality of displays, an application may be provided for each of the displays and thus, the setting control mode may also be provided for each home screen. In this case, however, each of the plurality of displays is required to enter the setting control mode to set up the home screens of the displays, which may cause inconvenience.

Accordingly, there is a desire for technology for setting up home screens of a plurality of displays with increased ease and efficiency.

DISCLOSURE OF INVENTION

Technical Goals

An aspect provides a mobile terminal (or electronic device) and a control method of the mobile terminal to more easily and efficiently set up a home screen by performing home screen settings of a plurality of displays through one display based on information on each home screen of the plurality of displays being stored in one database.

The technical goals to be achieved by the example embodiments of the present disclosure are not limited to the technical goals described above, and although not mentioned, other technical goals that will be clearly understood by those skilled in the art may be inferred from the following example embodiments.

Technical Solutions

According to an aspect, there is provided an electronic device for setting up home screens of a first display and a second display, the electronic device including a database in which information on a first home screen displayed on the first display and information on a second home screen displayed on the second display are stored, and a controller, wherein the controller is configured to receive an input to enter a setting control mode for controlling settings of the home screens, acquire the information on the first home screen and the information on the second home screen from the database in response to the input being received, and provide, through the first display, the information on the first home screen and the information on the second home screen in the setting control mode, the first home screen is displayed on the first display by a first application, and the second home screen is displayed on the first display by a second application.

According to another aspect, there is also provided a method of setting up home screens of a first display and a second display in an electronic device, the method including receiving an input to enter a setting control mode for controlling settings of the home screens, acquiring information on a first home screen displayed on the first display and information on a second home screen displayed on the second display from a database in response to the input being received, providing, through the first display, the information on the first home screen and the information on the second home screen in the setting control mode, wherein the first home screen is displayed on the first display by a first application and the second home screen is displayed on the second display by a second application.

Effects

According to example embodiments, a mobile terminal (or electronic device) and a control method of the mobile terminal may more easily and efficiently set up a home screen by performing home screen settings of a plurality of displays through one display based on information on each home screen of the plurality of displays being stored in one database.

Effects of the present disclosure are not limited to the above-mentioned effects, and other effects that are not mentioned will be clearly understood by those skilled in the art from the description of the scope of the claims.

BEST MODE FOR CARRYING OUT THE INVENTION

Figure 1:
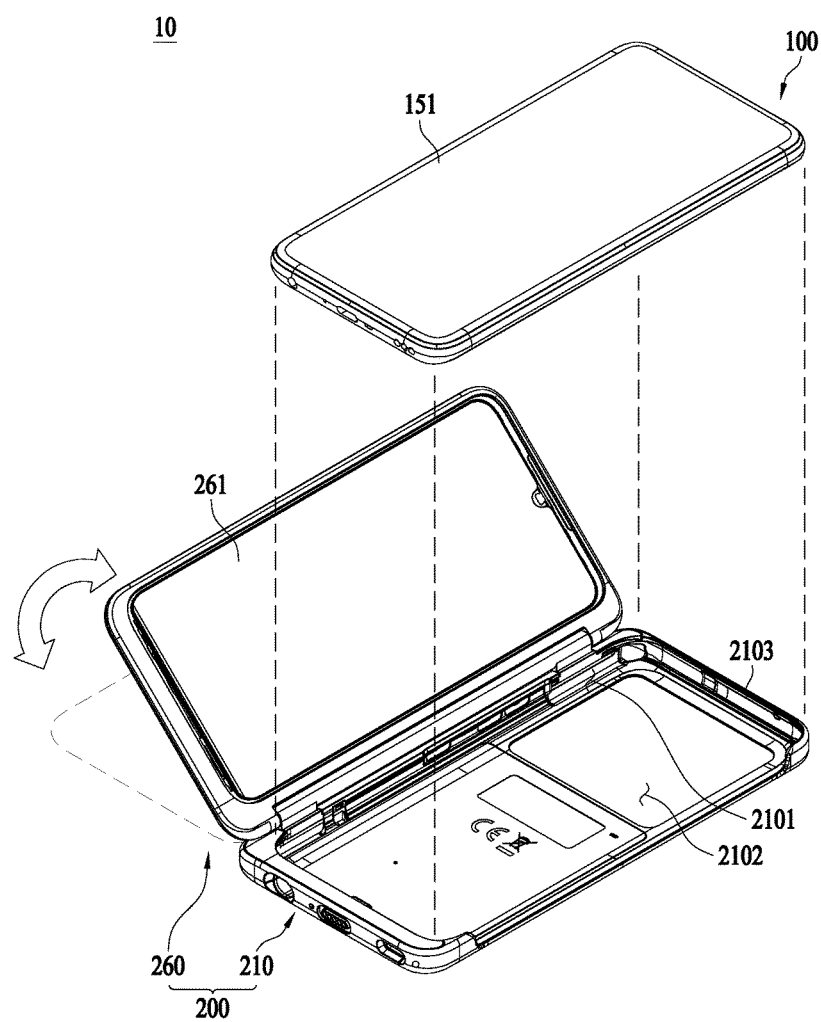
FIG. 1 illustrates a terminal set in a state in which a mobile terminal is uncoupled from an auxiliary device according to the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined by the appended claims.

In the description of embodiments, detailed description of well-known related structures or functions will be omitted when it is deemed that such description will cause ambiguous interpretation of the present disclosure. Terminologies used herein are defined to appropriately describe the example embodiments of the present disclosure and thus may be changed depending on a user, the intent of an operator, or a custom. Accordingly, the terminologies must be defined based on the following overall description of this specification.

While example embodiments of the inventive concepts are capable of various modifications and alternative forms, embodiments thereof are shown by way of example in the drawings and will herein be described in detail. It should be understood, however, that there is no intent to limit this disclosure to the particular example embodiments disclosed. On the contrary, example embodiments are to cover all modifications, equivalents, and alternatives falling within the scope of the example embodiments.

It will be understood that, although the terms first, second, etc. may be used herein to describe various elements, these elements should not be limited by these terms. These terms are only used to distinguish one element from another.

When an element, such as a layer, region, or substrate, is described as being "on," "connected to," or "coupled to" another element, it may be directly "on," "connected to," or "coupled to" the other element, or there may be one or more other elements intervening therebetween. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultrabooks, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 2:
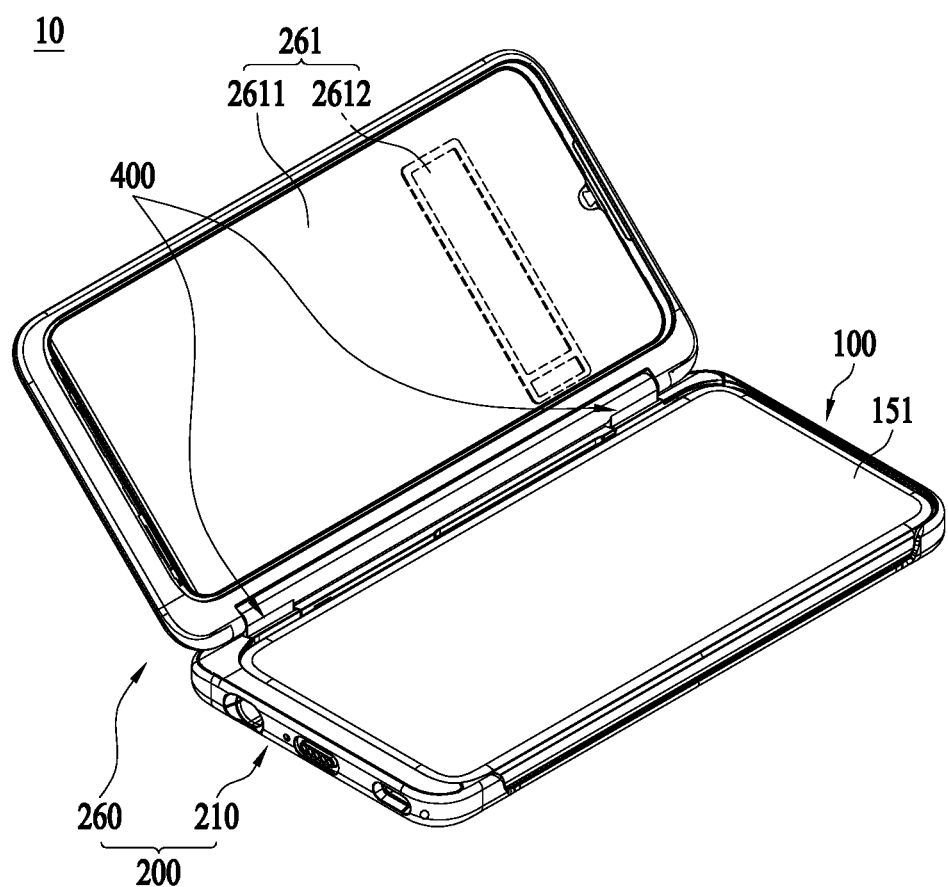
FIG. 2 illustrates a terminal set in a state in which a mobile terminal is coupled to an auxiliary device.
Figure 3:
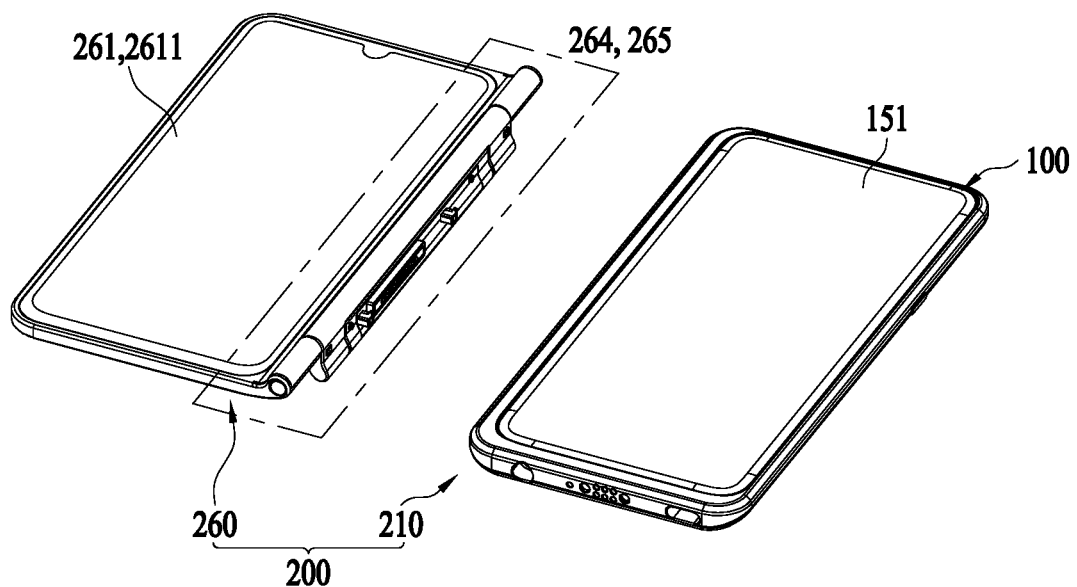
FIG. 3 illustrates a cover member of the auxiliary device being separated in the state of FIG. 2.

FIGS. 1 through 3 are conceptual diagrams illustrating a terminal set 10 related to the present disclosure. FIG. 1 illustrates the terminal set 10 in a state in which a mobile terminal 100 is uncoupled from an auxiliary device 200. FIG. 2 illustrates a state in which the mobile terminal 100 is coupled to the auxiliary device 200. FIG. 3 illustrates a cover member 260 of the auxiliary device 200 being separated in the state of FIG. 2. For better understanding, a reference will be made along with FIGS. 1 through 3.

The terminal set 10 of the present disclosure may include the mobile terminal 100 including a display and the auxiliary device 200 that provides an extended display in combination with the mobile terminal 100. The auxiliary device 200 may include a seating member 210 to which the mobile terminal 100 is coupled and the cover member 260 that is coupled to the seating member 210 to selectively cover the mobile terminal 100 and mounts an extended display thereon.

As described above, the terminal set 10 of the present disclosure may increase usability by providing a multi-display in which the mobile terminal 100 and the auxiliary device 200 each form an output area. A display included in the mobile terminal 100 is defined as a first display 151, and a display included in the auxiliary device 200 is defined as a second display 261.

The second display 261 may be provided both at an inner surface and at an outer surface of the cover member 260. The auxiliary display 261 provided at the inner surface is defined as an inner second display 2611, and the auxiliary display 261 provided at the outer surface is defined as an outer second display 2612. When the cover member 260 is unfolded, the inner second display 2611 may be used to be visible at the same time with the first display. When the cover member 260 is folded, the outer second display 2612 may be used especially to be visible on the terminal set 10.

The first display 151 and the second display 261, for example, the inner second display 2611 may be output in connection with each other. For example, the first display 151 and the inner second display 2611 may be output through mirroring, or a screen displayed on the first display 151 may be moved to the inner second display 2611 to be output. Also, execution screens of one application or a plurality of related applications may be separately displayed on the first display 151 and the inner second display 2611. For example, a controller of a game application may be displayed on the first display 151 and game content may be displayed on the inner second display 2611. That is, the terminal set 10 of the present disclosure may operate as one device having a plurality of displays, which may indicate that the auxiliary device 200 shares several configurations provided in the mobile terminal 100.

The outer second display 2612 may output relatively simple information. For example, the outer second display 2612 may perform functions of outputting simple text information or image information, such as receiving a call, receiving a message, and setting off an alarm. As the outer second display 2612 is provided, there is an advantage that information can be confirmed without any additional operation with the cover member 260 closed.

A controller 180 and a power supply 190 of the mobile terminal 100 may supply power to the second display 261 as well as the first display 151 and perform data transmission and reception. Accordingly, the auxiliary device 200 may operate without the controller 180 or the power supply 190. Through this, a weight or volume of the auxiliary device 200 may be reduced, and an effect of reducing manufacturing cost may be achieved.

For power supply and data transmission and reception to the second display 261, the mobile terminal 100 may be physically coupled to the auxiliary device 200, and the auxiliary device 200 may include a circuit for electrically connect the mobile terminal 100 and the second display 261. The circuit is defined as an auxiliary circuit part.

The auxiliary device 200 of the present disclosure proposes a form in which the cover member 260 is selectively attached to and detached from the seating member 210. Advantages of the auxiliary device 200 having the detachable cover member 260 are as follows.

First, if the cover member 260 is not used, the mobile terminal 100 may be physically protected by coupling only the seating member 210 to the mobile terminal 100. In a typical case in which the cover member 260 is fixed to the seating member 210, the mobile terminal 100 may be used with a large volume and weight even when the cover member 260 is not used, which reduces the grip of the mobile terminal 100. Such disadvantage may be eliminated by coupling only the seating member 210 to the mobile terminal 100.

Second, the detachable cover member 260 may be used continuously even if the mobile terminal 100 and the seating member 210 are replaced. For example, even if the seating member 210 coupled to the mobile terminal 100 is damaged or lost during use, only the seating member 210 may be replaced and the cover member 260 may be used without changing.

Third, even in a case in which the mobile terminal 100 and the seating member 210 different in shape and size from the previously used mobile terminal 100 are used, the previously used cover member 260 may be coupled and used. In this case, it is assumed that the mobile terminal 100 and the seating member 210 different in shape and size are configured to be compatible with the existing cover member 260.

Fourth, the cover member 260 may be coupled in other ways. For example, when the cover member 260 is turned over and coupled to the seating member 210, the two displays 151 and 261 may face in the same direction or in opposite directions, so that a variety of user experiences are provided.

Referring to FIG. 3, in some cases, the seating member 210 may be, for example, a terminal case. In such cases, the seating member 210 forms a seating area 210 in which a rear surface of the mobile terminal 100 seats. The seating member 210 forms an open area so that an output area of the display of the mobile terminal 100, that is, the first display 151, may be visible on the front side when the mobile terminal 100 seats in the seating member 210. At the same time, at least one area of the rear surface of the seating member 210 has an opening so as to expose a camera of the mobile terminal 100 and the like. A side circumference of the seating member 210 may be formed to correspond to a side circumferential shape of the mobile terminal 100 so as to enable the mobile terminal 100 to fit into the terminal case 210.

The cover member 260 and the seating member 210 of the auxiliary device 200 of the present disclosure may be connected and disconnected by a fastener 264.

When coupled to the seating member 210, the cover member 260 may form at least one rotation axis at one edge of the seating member 210 to selectively cover the seating area.

The cover member 260 may be detachably coupled to a side surface of one edge of the seating member 210 or a side rear surface thereof. Coupling to the side may minimize an increase in thickness of the terminal set 10. Coupling to the side rear surface may minimize an increase in size of a bezel of the terminal set 10. The present disclosure is described based on a case in which the cover member 260 is coupled to the side surface of the seating member 210. In some cases, the cover member 260 may be coupled to the rear side of the seating member 210.

The cover member 260 may mount a display panel 2611 thereon to provide the second display 261. The display panel 2611 may be exposed to one side of the cover member 260 to form an output area. The display panel 2611 may include a touch panel to receive an external touch input.

A hinge 265 may be provided on the cover member 260 to provide at least one rotation axis such that the cover member 260 rotates about the seating member 210. The cover member 260 rotated by the hinge 265 may selectively cover the seating area of the seating member 210.

Figure 4:
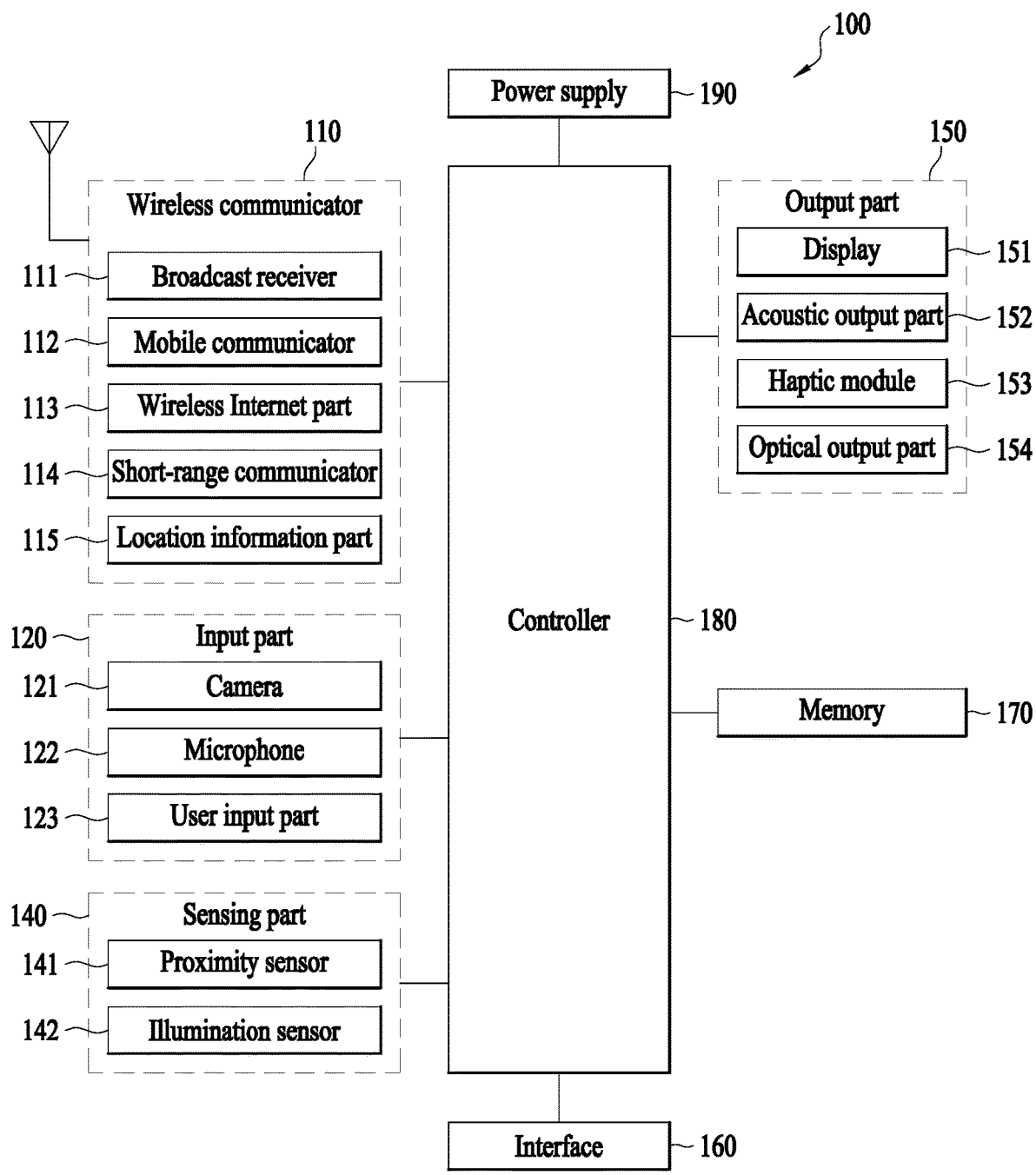
FIG. 4 is a block diagram illustrating a mobile terminal related to the present disclosure.

FIG. 4 is a block diagram illustrating the mobile terminal 100 according to the present disclosure.

The mobile terminal 100 may include a wireless communicator 110, an input part 120, a sensing part 140, an output part 150, an interface 160, a memory 170, a controller 180, and a power supply 190. It is understood that implementing all of the components illustrated in FIG. 3 is not a requirement, and that more or fewer components may alternatively be implemented.

More specifically, the wireless communicator 110 may include one or more modules which enable communications such as wireless communications between the mobile terminal 100 and a wireless communication system, communications between the mobile terminal 100 and another mobile terminal 100, communications between the mobile terminal 100 and an external server. Further, the wireless communicator 110 typically includes one or more modules which connect the mobile terminal 100 to one or more networks.

The wireless communicator 110 may include one or more of a broadcast receiver 111, a mobile communicator 112, a wireless Internet part 113, a short-range communicator 114, and a location information part 115.

The input part 120 may include a camera 121 for obtaining images or video or an image input part, a microphone 122 for inputting an audio signal or an audio input part, a user input part 123 (for example, a touch key, a mechanical key, and the like) for allowing a user to input information, and the like. Voice data or image data collected by the input part 120 may be analyzed and processed into a user's control command.

The sensing part 140 may include one or more sensors configured to sense at least one of internal information of the mobile terminal 100, the surrounding environment of the mobile terminal 100, or user information. For example, the sensing part 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, the camera 121), a microphone (for example, the microphone 122), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from two or more sensors of the aforementioned sensors, and combinations thereof.

The output part 150 is configured to generate various types of output, such as audio, video, tactile output, and the like. The output part 150 may include a display 151, an acoustic output part 152, a haptic module 153, and an optical output part 154. The display 151 of the mobile terminal 100 corresponds to the first display described with reference to FIGS. 1 through 3. The display 151 may be inter-layered with or integrally formed with a touch sensor to facilitate a touch screen. Such a touch screen may provide an output interface between the mobile terminal 100 and a user, as well as function as the user input part 123 which provides an input interface between the mobile terminal 100 and the user.

The interface 160 serves as an interface with various types of external devices that can be coupled to the mobile terminal 100. The interface 160 may include, for example, at least one of a wired or wireless port, an external power supply port, a wired or wireless data port, a memory card port, a port for connecting a device having an identification module, an audio input/output (I/O) port, a video I/O port, or an earphone port. In some cases, the mobile terminal 100 may perform assorted control functions associated with a connected external device, in response to the external device being connected to the interface 160.

The memory 170 stores data to support various functions or features of the mobile terminal 100. For instance, the memory 170 may be configured to store application programs executed in the mobile terminal 100, data or instructions for operations of the mobile terminal 100, and the like. At least some of the application programs may be downloaded from an external server via wireless communication. At least some of the application programs may be installed within the mobile terminal 100 at time of manufacturing or shipping, which is typically the case for basic functions of the mobile terminal 100 (for example, receiving a call, placing a call, receiving a message, sending a message, and the like). Meanwhile, application programs may be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs stored in the memory 170, thereby processing or providing appropriate information and/or functions to a user.

In order to execute application programs stored in the memory 170, the controller 180 may control at least some of the above-described components described with reference to FIG. 4. Further, in order to execute application programs stored in the memory 170, the controller 180 may control at least two or more of the components included in the mobile terminal 100 in combination.

Under the control of the controller 180, the power supply 190 receives external power or internal power or provides power to each component included in the mobile terminal 100. The power supply 190 may include a battery, and the battery may be an embedded battery or a replaceable battery.

In addition, the power supply may include a charging port. The charging port may be configured as an example of the interface 160 to which an external charger that supplies power for charging the battery is electrically connected.

At least one portion of the respective components mentioned in the foregoing description can cooperatively operate to implement operations, controls or controlling methods of the mobile terminal 100 according to various embodiments of the present disclosure mentioned in the following description. Moreover, the operations, controls or controlling methods of the mobile terminal 100 can be implemented in the mobile terminal upon execution of at least one or more application programs stored in the memory 170.

Figure 5:
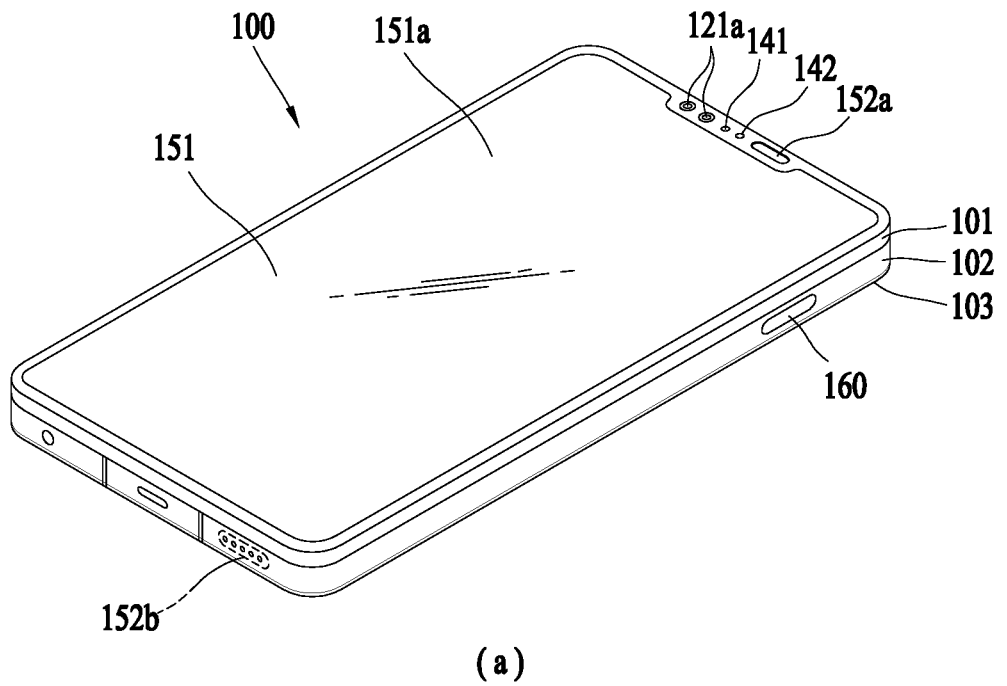
FIG. 5 illustrates a front perspective view and a rear perspective view of a mobile terminal related to the present disclosure.
Figure 5:
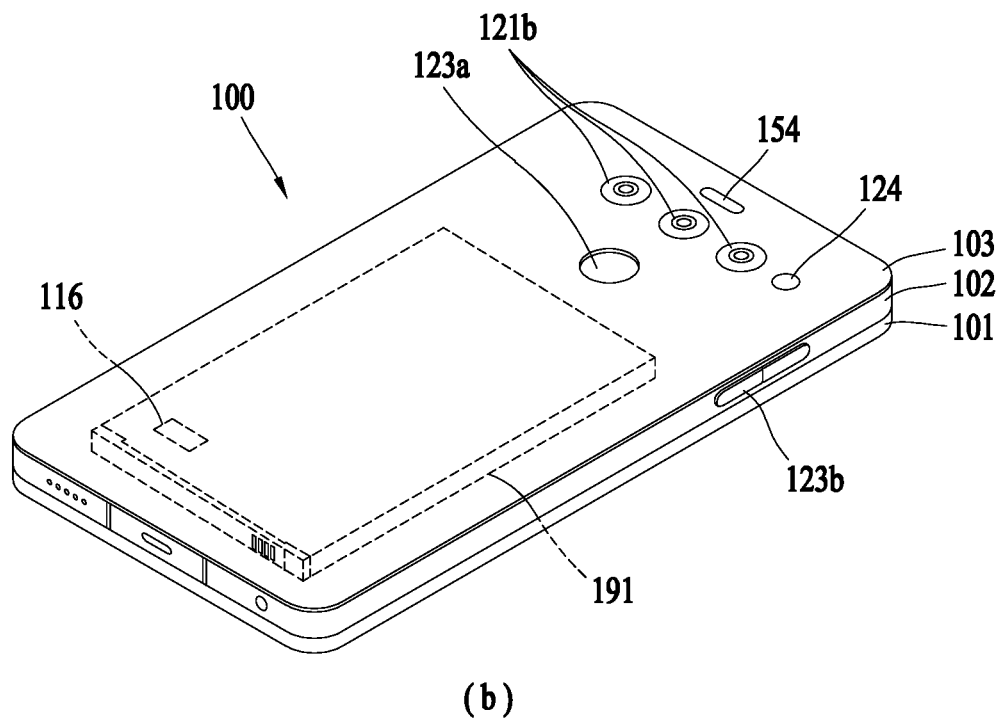

FIG. 5 illustrates a front perspective view and a rear perspective view of the mobile terminal 100 according to the present disclosure.

Referring to (a) of FIG. 5, the mobile terminal 100 may have a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined to be movable relative to each other, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood as a concept referring to the mobile terminal 100 as at least one aggregate.

The mobile terminal 100 includes a case (for example, a frame, a housing, a cover, and the like) forming the appearance of the mobile terminal. As illustrated, the mobile terminal 100 may include a front case 101 and a rear case 102. Various electronic components are arranged in an inner space formed through coupling of the front case 101 and the rear case 102. At least one middle case may be additionally arranged between the front case 101 and the rear case 102.

The display 151 may be located on the front side of the mobile terminal body to output information. As illustrated, a window 151a of the display 151 may be mounted to the front case 101 to form the front surface of the mobile terminal body together with the front case 101.

In some cases, electronic components may also be mounted to the rear case 102. Examples of such electronic components include a detachable battery, an identification module, a memory card, and the like. In this case, a rear cover 102 may be detachably coupled to the rear case 102 to cover the electronic components mounted to the rear case. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. Meanwhile, the rear cover 103 may include an opening for externally exposing a camera 121b or an acoustic output part 152b.

The cases 101, 102, and 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating various electronic components, the mobile terminal 100 may be configured such that one case forms the inner space. In this example, a mobile terminal 100 having a uni-body is formed in such a manner that synthetic resin or metal extends from a side surface to a rear surface.

Meanwhile, the mobile terminal 100 may include a waterproof part (not shown) for preventing introduction of water into the mobile terminal body. For example, the waterproof part may include a waterproof member which is located between the window 151a and the front case 101, between the front case 101 and the rear case 102, or between the rear case 102 and the rear cover 103, to seal an inner space when those cases are coupled.

The mobile terminal 100 may be provided with the display 151, a first acoustic output part 152a, a second acoustic output part 152b, the proximity sensor 141, the illumination sensor 142, the optical output part 154, the first camera 121a, the second camera 121b, the first manipulating part 123a, a second manipulating part 123b, the microphone 122, the interface 160, and the like.

In the following, it is described by taking an example, as shown in FIG. 5, that the display 151, the first acoustic output part 152a, the proximity sensor 141, the illumination sensor 142, the optical output part 154, the first camera 121a, and the first manipulating part 123a are arranged at the front side of the mobile terminal body, that the second manipulating part 123b, the microphone 122, and the interface 160 are arranged on a side surface of the mobile terminal body, and that the second manipulating part 123b and the second camera 121b are arranged at a rear side of the mobile terminal body.

However, these components are not limited to the above-described arrangement. Such components may be excluded or replaced or arranged on a different surface, when necessary. For example, the first manipulating part 123a may not be provided at the rear side of the mobile terminal body, and the second acoustic output part 152b may be provided not at the side surface of the mobile terminal body, but at the rear surface of the mobile terminal body.

The display 151 may display (output) information processed in the mobile terminal 100. For example, the display 151 may display execution screen information of an application program executing at the mobile terminal 100 or user interface (UI) and graphic user interface (GUI) information in response to the execution screen information.

The display 151 may include at least one of a liquid crystal display (LCD), a thin film transistor-liquid crystal display (TFT-LCD), an organic light emitting diode (OLED), a flexible display, a 3-dimensional (3D) display, or an e-ink display.

In addition, the display 151 may be implemented as two display devices, according to an implementing form of the mobile terminal 100. In this case, a plurality of the displays may be arranged on one surface, either spaced apart from each other, or these devices may be integrated, or these devices may be arranged on different surfaces.

In order to receive a control command in a touching manner, the display 151 may include a touch sensor for sensing a touch input received at the display 151. When a touch is input to the display 151, the touch sensor may sense the touch and the controller 180 may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151a and a display (not shown) at a rear side of the window 151a, or a metal wire which is patterned directly on the rear surface of the window 151a. Alternatively, the touch sensor may be integrally formed with the display. For example, the touch sensor may be disposed on a substrate of the display or within the display.

As such, the display 151 may also form a touch screen together with the touch sensor. In this case, the touch screen may serve as the user input part 123 (see FIG. 1A). In some cases, the touch screen may replace at least some of the functions of the first manipulating part 123a.

The first acoustic output part 152a may be implemented in the form of a receiver that delivers voice audio to a user's ear, and the second acoustic output part 152b may be implemented in the form of a loud speaker that outputs various alarm sounds or multimedia audio reproduction.

An aperture for releasing audio generated by the first acoustic output part 152a may be formed in the window 151a of the display 151. However, aspects of the present disclosure are not limited thereto, and audio may be released along an assembly gap between structural bodies (for example, a gap between the window 151a and the front case 101). In this case, a hole independently formed to output audio sounds may not be seen or may be hidden in terms of appearance, thereby further simplifying the appearance of the mobile terminal 100.

The optical output part 154 is configured to output light for indicating occurrence of an event. Examples of such events include a message reception, a call signal reception, a missed call, an alarm, a schedule notice, an email reception, information reception through an application, and the like. When a user has checked a generated event, the controller 180 may control the optical output part 154 to stop outputting light.

The first camera 121a processes image frames such as still or moving images obtained by the image sensor in a capture mode or a video call mode. The processed image frames may be displayed on the display 151 and may be stored in the memory 170.

The first and second manipulating parts 123a and 123b are examples of the user input part 123 that is manipulated to receive a command for controlling operation of the mobile terminal 100, and may also be referred to as a manipulating portion. The first and second manipulating parts 123a and 123b may employ any tactile manner that allows the user to perform manipulation such as touch, push, scroll, or the like. In addition, the first and second manipulating parts 123a and 123b may employ any non-tactile method that allows the user to perform manipulation such as proximity touch, hovering, or the like.

In this drawing, the first manipulating part 123a is, for example, a touch key. However, the present disclosure is not limited to the example. For example, the first manipulating part 123a may be a mechanical key or configured in combination of a touch key and a mechanical key.

Contents input by the first and second manipulating parts 123a and 123b may be set in various ways. For example, the first manipulating part 123a may receive an input to a menu, a home key, cancellation, search, or the like. Also, the second manipulating part 123b may receive an input control a volume level being output from the first or second acoustic output part 152a or 152b, to switch to a touch recognition mode of the display 151, or the like.

Meanwhile, as another example of the user input part 123, a rear input part (not shown) may be located at the rear side of the mobile terminal body. The rear input part is manipulated to receive an input for controlling operation of the mobile terminal 100. The input may be set in a variety of different ways. For example, the rear input part may receive an input for power on/off, start, end, scroll, control volume level being output from the first or second acoustic output part 152a or 152b, switch to a touch recognition mode of the display 151, and the like. The rear input part may be configured to allow a touch input, a mechanical input, or combinations thereof.

The rear input part may be located to overlap the display 151 of the front side in a thickness direction of the mobile terminal body. In one example, the rear input part may be located on an upper end portion of the rear side of the mobile terminal body such that a user can easily manipulate it using a forefinger when the user grabs the mobile terminal body with one hand. However, aspects of the present disclosure are not limited thereto, and the position of the rear input part may change.

As such, when the rear input part is provided at the rear side of the mobile terminal body, a new type of user interface may be implemented using the rear input part. In addition, when the touch screen or rear input part replaces at least some functions of the first manipulating part 123a provided on the front surface of the terminal body, and the first manipulating part 123a is not disposed on the front surface of the terminal body, the display 151 may be configured as a larger screen.

Meanwhile, the mobile terminal 100 may include a finger scan sensor for recognizing a user's fingerprint. The controller 180 may use fingerprint information sensed by the finger scan sensor as part of an authentication procedure. The finger scan sensor may be embedded in the display 151 in the user input part 123.

The microphone 122 is configured to receive a user's voice, other sound, and the like. The microphone 122 may be provided in plural to receive stereo sound.

The interface 160 serves as a path allowing the mobile terminal 100 to interface with an external device. For example, the interface 160 may include one or more of a connection mobile terminal for connecting to another device (e.g., an earphone, an external speaker, or the like), a port for near field communication (e.g., an infrared data association (IrDA) port, a Bluetooth port, a wireless LAN port, and the like), or a power supply port for supplying power to the mobile terminal 100. The interface 160 may be implemented in the form of a socket for accommodating an external card, such as a subscriber identification module (SIM), a user identity module (UIM), or a memory card for information storage.

The second camera 121b may be located at the rear side of the mobile terminal body. In this case, the second camera 121b may have an image capturing direction substantially opposite to that of the first camera 121a.

The second camera 121b may include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

The flash 124 may be located adjacent to the second camera 121b. When an image of a subject is captured with the second camera 121b, the flash 124 may illuminate the subject.

The second acoustic output part 152b may be additionally provided in the mobile terminal body. The second acoustic output part 152b may implement stereophonic sound functions in conjunction with the first acoustic output part 152a, and may also be used for implementing a speaker phone mode for call communication.

At least one antenna for wireless communication may be located on the mobile terminal body. The antenna may be installed in the mobile terminal body or formed by the case. For example, an antenna which configures a part of the broadcast receiver 111 (see FIG. 4) may be retractable into the mobile terminal body. Alternatively, an antenna may be in the form of a film attached to an inner surface of the rear cover 103 or in the form of a case including a conductive material.

The power supply 190 (see FIG. 4) for supplying power to the mobile terminal 100 may be provided at the mobile terminal body. The power supply 190 may include a battery 191 embedded in the mobile terminal body or detachably coupled to an outside of the mobile terminal body.

The battery 191 may be configured to receive power via a power source cable connected to the interface 160. Also, the battery 191 may be configured to be recharged in a wireless manner using a wireless charger. Wireless charging may be implemented by magnetic induction (electromagnetic resonance).

Meanwhile, in the drawing, the rear cover 103 is coupled to the rear case 102 for shielding the battery 191, to prevent separation of the battery 191, and to protect the battery 191 from an external impact or from foreign material. When the battery 191 is detachable from the mobile terminal body, the rear case 103 may be detachably coupled to the rear case 102.

An accessory for protecting an appearance or assisting or extending the functions of the mobile terminal 100 may also be provided on the mobile terminal 100. As an example, the accessory may be a cover or pouch for covering or accommodating at least one surface of the mobile terminal 100. The cover or pouch may cooperate with the display 151 to extend the function of the mobile terminal 100. As another example, the accessory may be a touch pen for assisting or extending a touch input to a touch screen.

Figure 6:
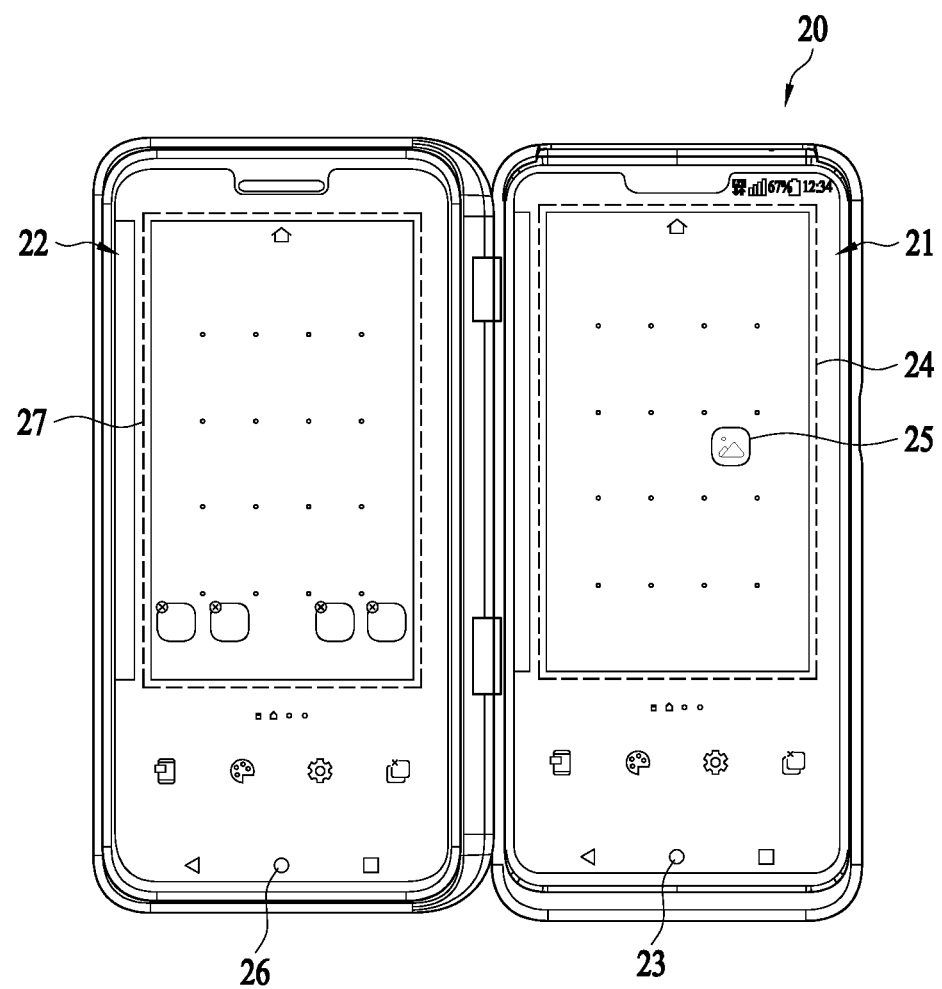
FIG. 6 is a conceptual diagram illustrating home screen settings of an electronic device including a plurality of displays.

FIG. 6 is a conceptual diagram illustrating home screen settings of an electronic device including a plurality of displays. Specifically, FIG. 6 illustrates an example of a screen displayed on an electronic device including a plurality of displays when setting up a home screen in the electronic device.

Referring to FIG. 6, an electronic device 20 may be implemented as a mobile terminal and include a first display 21 and a second display 22. Each of the first display 21 and the second display 22 may display various contents to provide visual information to the user.

The electronic device 20 may provide a home screen through the first display 21 and the second display 22. The home screen may be freely changed according to user's settings. For this, the electronic device 20 may provide a setting control mode.

Referring to FIG. 6, a setting control mode may be provided for each home screen. Specifically, as illustrated in FIG. 6, the first display 21 may provide a first setting control mode for a first home screen, and the second display 22 may provide a second setting control model for a second home screen.

Specifically, when a predetermined input is received through the first display 21, the electronic device 20 may display a setting control mode for a home screen of the first display 21. For example, the predetermined input may be a touch input for a first home button 23 on the first display 21.

Once entering the first setting control mode, the electronic device 20 may provide a first preview 23 for setting the first home screen on the first display 21. The first preview 24 may be displayed by reducing the first home screen and may be a screen corresponding to the first home screen.

The electronic device 20 may set the first home screen using the first preview 24. For example, in response to a reception of a user input for moving an application (or an icon 25 indicating the application) from a first position to a second position with respect to the first preview 24, the electronic device 20 may position the application on the first home screen based on the reception.

When a predetermined input is received through the second display 22, the electronic device 20 may display a setting control mode for a home screen of the second display 22. For example, the predetermined input may be a touch input for a second home button 23 on the second display 22.

Once entering the second setting control mode, the electronic device 20 may provide a second preview 27 for setting the second home screen on the second display 22. The second preview 27 may be displayed by reducing the second home screen and may be a screen corresponding to the second home screen.

As such, in the case in which the electronic device 20 includes a plurality of displays, when setting the home screen of each display, entering a separate setting control mode may be required to set the home screen independently. In this case, a relatively large number of inputs may be required to set the home screen of a plurality of displays, which may cause inconvenience to the user in setting the home screen.

In the following description, when a plurality of displays is included, an electronic device according to an example embodiment of the present disclosure may allow settings of home screens of the plurality of displays through one display (e.g., a first display). Through this, it is possible to prevent the aforementioned inconvenience and provide the user with the convenience of setting the home screen.

Figure 7:
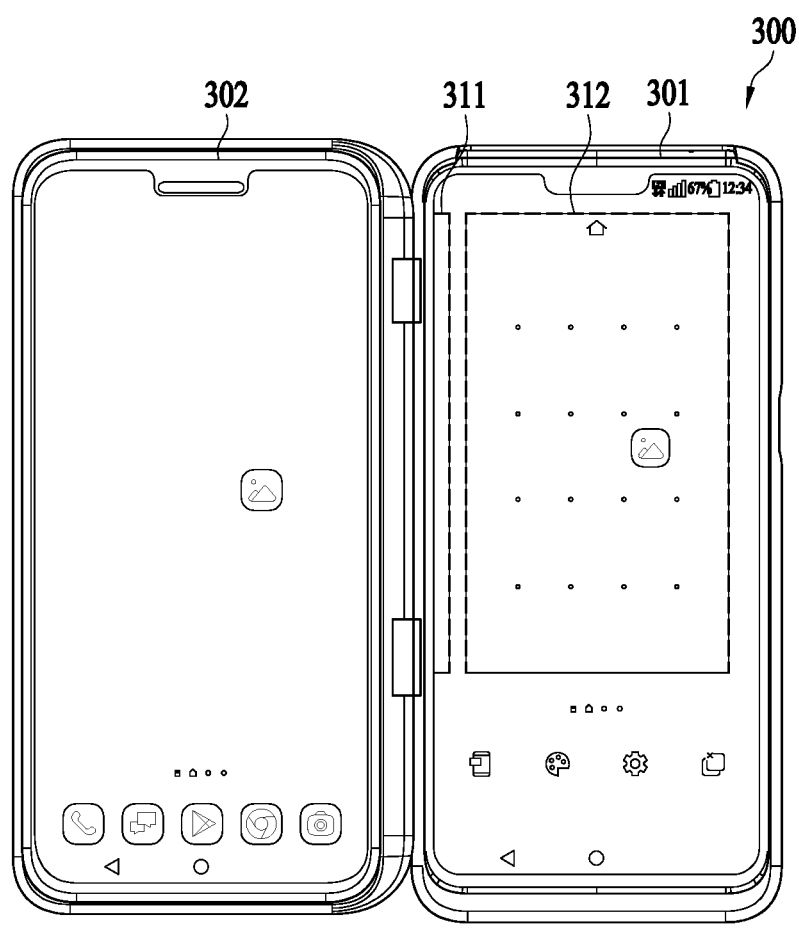
FIG. 7 is a conceptual diagram illustrating home screen settings of an electronic device according to an example embodiment of the present disclosure.

FIG. 7 is a conceptual diagram illustrating home screen settings of an electronic device according to an example embodiment of the present disclosure.

Referring to FIG. 7, an electronic device 300 according to an example embodiment of the present disclosure may include a first display 301 and a second display 302. In some cases, the second display 302 may be included in another device (e.g., the auxiliary device 200 of FIG. 1). In some cases, the electronic device 300 may be provided in combination with another device.

The electronic device 300 may provide a setting control mode for setting a home screen. As illustrated, the setting control model may be provided on the first display 301. Specifically, in the setting control mode, the electronic device 300 may provide a preview 311 of the first home screen of the first display 301 and a preview 312 of the second home screen of the second display 302 on the first display 301.

At this time, the first home screen may be provided on a first display 410 by a first application, and the second home screen may be provided on a second display 420 by a second application.

Here, the application may include a set of instructions to perform a predetermined function. In this case, the first application may include a set of instructions to display the first home screen on the first display 410, and the second application may include a set of instructions to display the second home screen on the second display 420. In some cases, each of the first application and the second application may use data stored in a database to perform a predetermined function.

For example, the first home screen may be a default screen displayed on the first display 410 in response to the first application being executed when the first display 410 is turned on. The second home screen may be a default screen displayed on the second display 420 in response to the second application being executed when the second display 420 is turned on.

The first home screen and the second home screen may have similar functions, but may be independent elements provided by separate applications. As will be described later, information on the first home screen and information on the second home screen may be stored in one database, for example, a database 430 so as to be provided through one display, for example, the first display 410.

Accordingly, the electronic device 300 may allow settings of the first home screen provided through the first display 301 and settings of the second home screen provided through the second display 302 to be performed through the first display 301, that is, one application or one setting control mode.

Specifically, when a predetermined input to enter a setting control mode is received, the electronic device 300 may provide a screen for setting the first home screen and the second home screen on the first display 301. When a user input of changing settings of the first home screen or the second home screen for the provided screen is received, the electronic device 300 may set the first home screen or the second home screen based on the received user input.

Figure 8:
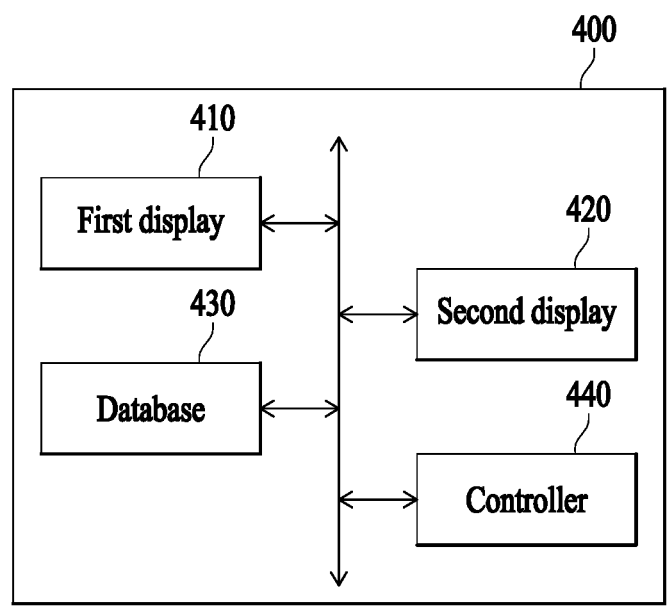
FIG. 8 is a functional block diagram illustrating an electronic device according to an example embodiment of the present disclosure.

FIG. 8 is a functional block diagram illustrating an electronic device according to an example embodiment of the present disclosure. Hereinafter, the term " . . . part" indicates a unit for processing at least one function or operation, which may be implemented as hardware or software, or a combination of hardware or software.

A controller 440 of FIG. 8 may be implemented by a computing device including a microprocessor. In example embodiments, the first display 410, the second display 420, or the database 430 may be included in the controller 440 as a hardware module or a software module.

Referring to FIG. 8, an electronic device 400 (e.g., the electronic device 300 of FIG. 7) may include the first display 410, the second display 420 (e.g., the second display 302 of FIG. 7), the database 430, and the controller 440.

The first display 410 may be a main display of the electronic device 400, and may be a display provided integrally with the electronic device 400.

The second display 420 may be a constituent element detachably attached to the first display 410, and separable from the first display 410.

In some cases, as described with reference to FIG. 1 through 3, the second display 420 may be a display included in the auxiliary device 200 (see FIG. 1). In such cases, in response to the electronic device 400 being separated from the auxiliary device 200, the second display 420 may be separated from the first display 410.

In the database 430, information on the first home screen displayed on the first display 410 and information on the second home screen displayed on the second display 420 may be stored.

The information on the first home screen may be information indicating a state of the first home screen currently provided (or provided before a predetermined period of time (e.g., one second)) on the first display. The information on the second home screen may be information indicating a state of the second home screen provided (or provided before a predetermined period of time (e.g., one second)).

Specifically, the information on the first home screen may include information on at least one of a layout of the first home screen, an icon included in the first home screen, and a widget included in the first home screen. The information on the second home screen may include information on at least one of a layout of the second home screen, an icon included in the second home screen, and a widget included in the second home screen.

In the example embodiment, a layout of a home screen (the first home screen or the second home screen) may indicate a detailed configuration of the home screen. Accordingly, information on the layout may include information on types, a number, sizes, and an arrangement order of background screens included in the home screen.

The information on the icon may include information on, for example, a position of the icon, a size of the icon, or an application connected to the icon. The information on the widget may include information on, for example, a position of the widget, a size of the widget, or an application connected to the widget.

In the example embodiment, in the database 430, information on various inputs received in association with the first home screen or the second home screen may be stored. For example, when a change input for the first home screen is received, the database 430 may store information on a change occurring in the first home screen in response to the change input.

The information stored in the database 430 may be classified into an input to the first home screen and an input to the second home screen. As an example, the information stored in the database 430 may be classified into an area of the first home screen and an area of the second home screen. In this example, the area of the first home screen and the area of the second home screen may be implemented based on at least one of software and hardware.

As another example, the information stored in the database 430 may be information to which an identifier indicating the first home screen is added or an identifier indicating the first home screen is added to be stored in the database 430.

The controller 440 may receive an input to enter a setting control mode of controlling settings of the home screen. The input may be, for example, a touch input applied to a predetermined area (e.g., a home button area) of the first display 410 but not be limited thereto.

In response to the input being received, the controller 440 may acquire the information on the first home screen and the information on the second home screen from the database 430.

In some cases, the information on the first home screen and the information on the second home screen may be distinguished from each other and stored in different areas of the database 430, or stored in the database 430 in a state in which identifiers indicating which home screen each piece of information is associated with are added.

Based on this, the controller 440 may acquire the information on the first home screen and the information on the second home screen from the database 430.

In the setting control mode, the controller 440 may provide the information on the first home screen and the information on the second home screen through the first display 410. The information on the first home screen may be provided as visual information such as a preview, and the information on the second home screen may be provided in a similar form. An example of a form in which information is provided will be described with reference to FIGS. 7 and 10 through 14.

The controller 440 may receive a change input for changing a layout of the first home screen or the second home screen based on a provision of the information on the first home screen and the information on the second home screen.

As an example, the change input may be an input of moving a first icon located at a first position in the first home screen to a second position. As another example, the change input may be an input of adding a wallpaper available on the first home screen. A description related to a change input will be described in greater detail with reference to FIGS. 10 through 14.

When the change input is related to the first home screen, the controller 440 may store information on the change input in the database 430 in association with the first application. When the change input is related to the second home screen, the controller 440 may store information on the change input in the database 430 in association with the second application.

For example, when the change input is related to the first home screen, that is, when the change input is related to the first home screen, the controller 440 may store information on the change input in an area related to the first application in the database. When the change input is related to the second home screen, the controller 440 may store information on the change input in an area related to the second application.

As an example, the information on the change input may include information on a final first home screen or a final second home screen on which a change is completed based on the change input. As another example, the information on the change input may include information indicating a change applied to the first home screen or the second home screen.

As another example, when the change input is related to the first home screen, the controller 440 may add information associated with the first application to the information on the change input and store the information in the database. When the change input is related to the second home screen, the controller 440 may add information associated with the second application to the information on the change input and store the information in the database. Here, the information associated to the first application may be a predetermined identifier indicating that the first application is related, and the information associated with the second application may be a predetermined identifier indicating that the second application is related.

As still another example, when the change input is related to the first home screen, the controller 440 may correct the information on the first home screen by reflecting the change input on the information on the first home screen. When the change input is related to the second home screen, the controller 440 may correct the information on the second home screen by reflecting the change input on the information on the second home screen.

Specifically, for example, when a change input for changing the layout, the icon, and the widget of the first home screen is received, the controller 440 may correct the exiting information on the first home screen to information on the changed first home screen.

The controller 440 may allow each of the first application and the second application to use the database 430. As an example, the controller 440 may allow information stored in the area related to the first home screen of the database 430, that is, the information on the first home screen to be processed by the first application and provided through the first display 410. The controller 440 may allow information stored in the area related to the second home screen of the database 430, that is, the information on the second home screen to be processed by the second application and provided through the second display 420.

As another example, the controller 440 may allow the first application to use the information to which the information (or the predetermined identifier) associated with the first application is added among the information stored in the database 430, so that the first home screen is provided through the first display 410. The controller 440 may allow the second application to use the information to which the information (or the predetermined identifier) associated with the second application among the information stored in the database 430, so that the second home screen is provided through the second display 420.

In such cases, the controller 440 may allow the first application to acquire the information on the first home screen using the database 430, process the acquired information, and display the first home screen. In addition, the controller 440 may allow the second application to acquire the information on the second home screen using the database 430, process the acquired information, and display the second home screen.

Depending on a case, the controller 440 may identify the information in the database 430 to provide the first application with the information associated with the first home screen among the information in the database 430 and provide the second application with the information associated with the second home screen.

The electronic device 400 according to an example embodiment of the present disclosure may enable settings of the first home screen or the second home screen to be performed through one display (e.g., the first display 410), so that the user can more easily set the home screen.

Figure 9:
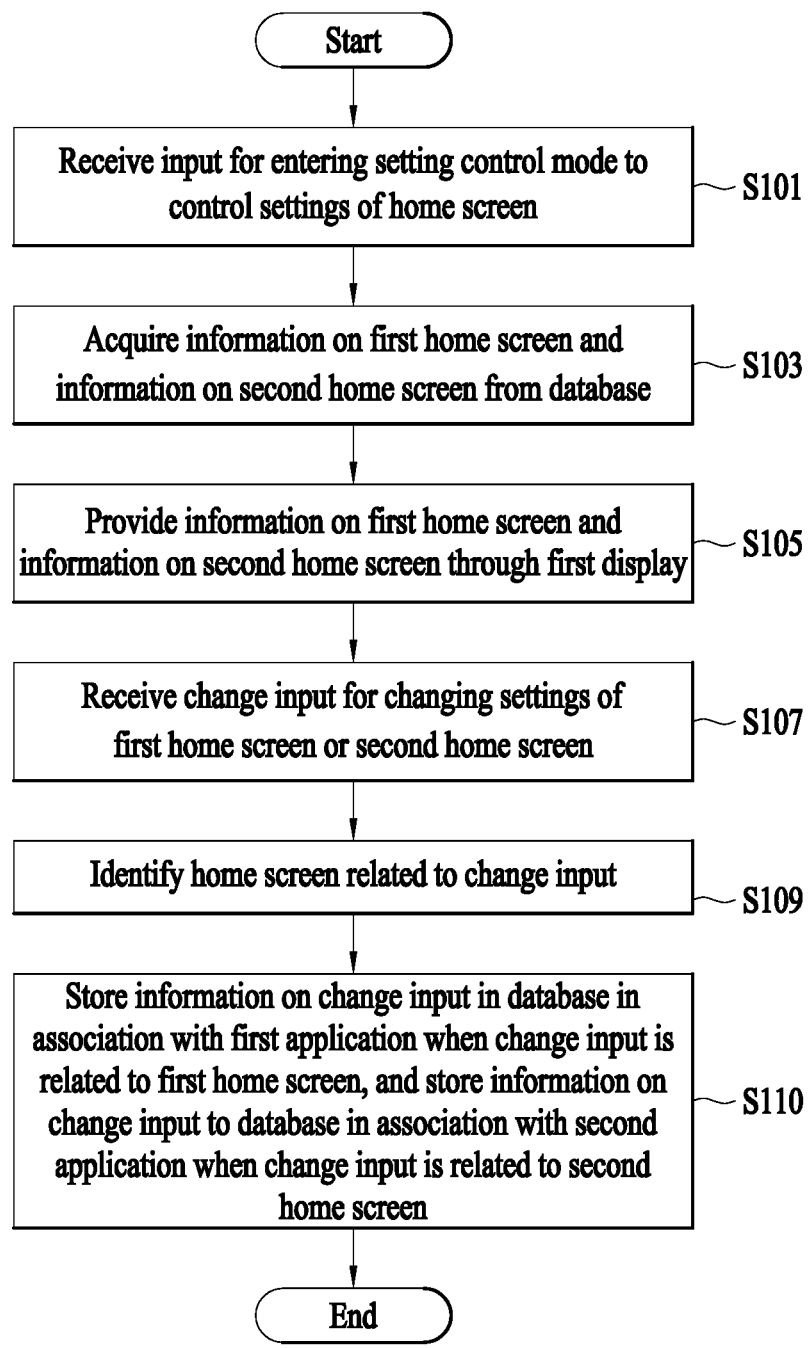
FIG. 9 is a flowchart illustrating a flow of operations of a home screen setting method according to an example embodiment of the present disclosure.

FIG. 9 is a flowchart illustrating a flow of operations of a home screen setting method according to an example embodiment of the present disclosure. Operations of FIG. 9 may be performed in a different order from that illustrated in the drawing in some cases.

Referring to FIG. 9, in operation S101, the controller 440 may receive an input for entering a setting control mode to control settings of a home screen. For example, the received input may be a predetermined input to initiate the setting control mode for setting the home screen. The predetermined input may be, for example, an input of pressing a home button provided on the electronic device 400 for at least three seconds, but not be limited thereto.

In operation S103, when the input for entering the setting control mode is received, the controller 440 may acquire information on a first home screen and information on a second home screen from the database 430.

The information on the first home screen and the information on the second home screen may be information stored in the database 430. For example, the information on the first home screen may be information on a configuration (e.g., layout, icon, and widget) of the first home screen displayed on the first display 410. The information on the second home screen may be information on a configuration (e.g., layout, icon, and widget) of the second home screen displayed on the second display 420.

In operation S105, the controller 440 may provide the information on the first home screen and the information on the second home screen through the first display 410. For example, in the setting control mode, the controller 440 may allow both information on the first home screen and information on the second home screen to be displayed on the first display 410.

In operation S107, the controller 440 may receive a change input for changing settings of the first home screen or the second home screen. In the setting control mode, the controller 440 may receive an input for changing settings of the first home screen, for example, a change input for changing a layout, a type or arrangement of an icon, or a type or arrangement of a widget.

In operation S109, the controller 440 may identify a home screen related to the change input. Specifically, the controller 440 may determine a home screen related to the change input based on a verification of whether the change input is to change settings of the first home screen or to change settings of the second home screen.

In operation S110, when the change input is related to the first home screen, the controller 440 may store information on the change input in a database in association with a first application. Also, when the change input is related to the second home screen, the controller 440 may store information on the change input to the database in association with a second application.

Specifically, when the change input is applied for the first home screen, the controller 440 may determine that the change input is related to the first home screen and store information on the change input in the database 430 in association with the first application. When the change input is applied for the second home screen, the controller 440 may determine that the change input is related to the second home screen and store information on the change input in the database 430 in association with the second application.

The controller 440 may store home screen information reflecting the change input in various ways. As an example, when the database 430 includes an area related to the first application and an area related to the second application, the controller 440 may store the information on the change input in the area related thereto.

That is, when the change input is related to the first home screen, the controller 440 may store the information on the change input in the area related to the first application. Likewise, when the change input is related to the second home screen, the controller 440 may store the information on the change input in the area related to the second application.

As another example, the controller 440 may identify an application by which the home screen set based on the changed input is provided, and add information on the corresponding application to the information on the change input so as to be stored in the database 430.

As another example, the controller 440 may replace information on the home screen set based on the change input with information obtained after the change so as to be stored in the database 430.

Although not shown, based on whether the first application or the second application is executed, the controller 440 may determine information suitable for each of the applications in the database 430 and provide the determined information.

For example, when the first application is executed, the controller 440 may provide the information on the first home screen to the first application. Also, when the second application is executed, the controller 440 may provide the information on the second home screen to the second application.

Accordingly, each of the first home screen displayed by the execution of the first application and the second home screen displayed by the execution of the second application may be the home screen set through the first display 410 by the operations described above.

Figure 10:
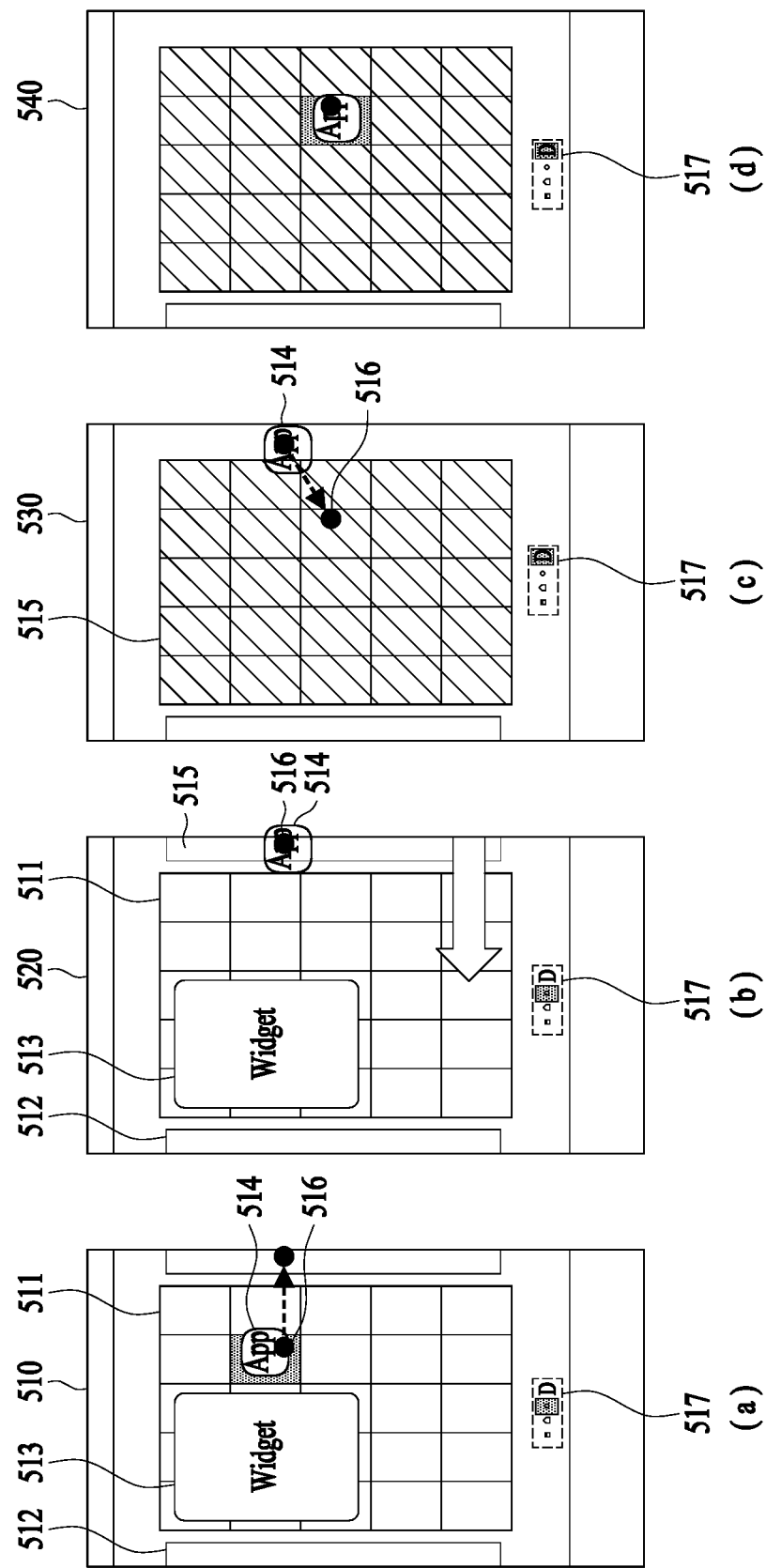
FIG. 10 is a diagram illustrating an example of a screen displayed for setting up a home screen in an electronic device according to an example embodiment of the present disclosure.

FIG. 10 is a diagram illustrating an example of a screen displayed for setting up a home screen in an electronic device according to an example embodiment of the present disclosure. Specifically, FIG. 10 illustrates a screen displayed on one display (e.g., the first display 410) to set up a home screen.

Upon entering a setting control mode, screens 510, 520, 530, and 540 may be displayed on the first display 410 as illustrated in (a), (b), (c), and (d) of FIG. 10. Specifically, the screens 510, 520, 530, and 540 may be screens displayed when applications arranged in the first home screen and the second home screen and positions of the applications are changed.

A first screen, for example, the screen 510 may be a screen that provides information on a first home screen as main information among the information on the first home screen and information on a second home screen.

Specifically, a home screen may have a plurality of wallpapers. One of the plurality of wallpapers may be set to a main wallpaper and displayed first when the home screen is displayed. In this case, according to a user input (e.g., drag input) to a wallpaper being displayed on the home screen, a wallpaper displayed on the display may be changed. Based on this, the first screen 510 may be a screen that provides a preview 511 of a first wallpaper in greater detail among previews 511 and 512 of two wallpapers provided on the first home screen.

Referring to FIG. 10, a widget 513 and an icon 514 may be arranged on the first wallpaper. At this time, a user input 516 for moving the icon 514 may be applied. The user input 516 may be an input for moving the icon 514 to another position, for example, a drag input.

At this time, a position to which the icon 514 is moved may be a predetermined position on the second home screen instead of the first home screen. In this case, on the first screen 510, information 515 on the second home screen may be moved as shown in a second screen 520 in response to the input for moving the icon 514 being applied to a portion showing an area related to the second home screen.

Through this, the information 515 on the second home screen may be displayed in greater detail as shown in a third screen 530. The information 515 on the second home screen may include information on a wallpaper of the second home screen. As shown in the third screen 530, the information on the wallpaper of the second home screen may be arranged in a largest area of the third screen 530. Accordingly, the information on the wallpaper of the second home screen may be displayed in greater detail.

A position of the icon 514 may be determined based on a position of an input 516. Referring to the third screen 530 and a fourth screen 540, in accordance with the input 516 positioned in a portion displaying the second home screen, the icon 514 may be determined to be located at a predetermined position of the wallpaper of the second home screen, for example, the position of the input 516.

Referring to the first screen 510 through the fourth screen 540, in a lower end portion of each of the screens, which home screen the wallpaper located in the largest area in the current screen (hereinafter, referred to as a mainly displayed screen) is for may be displayed. Specifically, an icon 517 indicating each of the wallpaper provided by the first home screen and the wallpaper provided by the second home screen may be displayed.

For example, the wallpaper provided by the first home screen may be indicated by a circle icon, and the wallpaper provided by the second home screen may be indicated by an icon with a text "D." A wallpaper corresponding to the mainly displayed wallpaper may be distinguished by changing a color of an icon or adding an additional mark such as an additional pattern to the icon. Through this, a user may be provided with information indicating which home screen includes the mainly displayed wallpaper.

Figure 11:
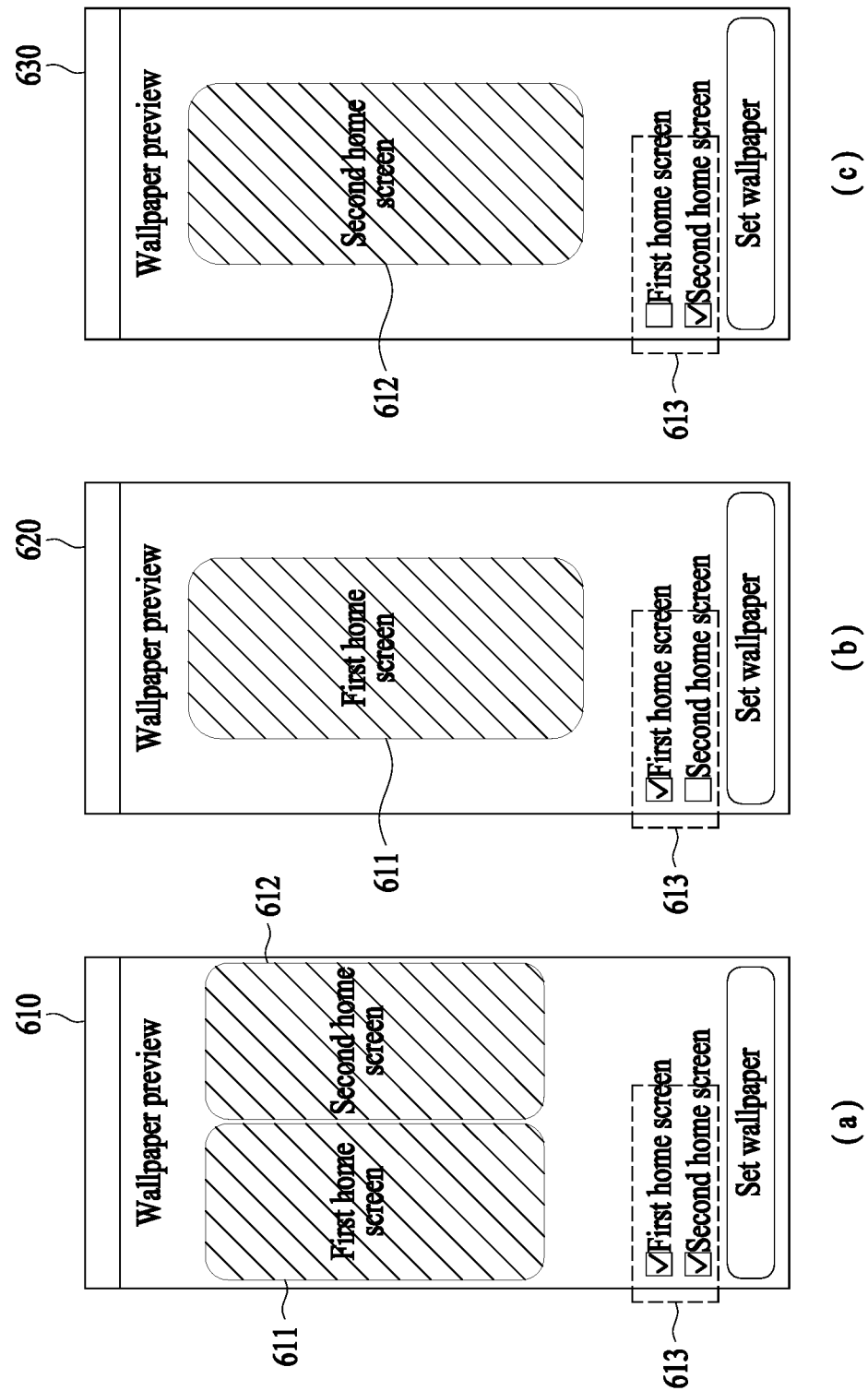
FIG. 11 is a diagram illustrating another example of a screen displayed for setting up a home screen in an electronic device according to an example embodiment of the present disclosure.

FIG. 11 is a diagram illustrating another example of a screen displayed for setting up a home screen in an electronic device according to an example embodiment of the present disclosure. Specifically, (a), (b), and (c) of FIG. 11 illustrate examples of screens displayed when a wallpaper displayed on a home screen is changed.

Referring to FIG. 11, a first screen 610 may show a preview of a wallpaper of a first home screen and a preview 612 of a wallpaper of a second home screen.

Specifically, when the first home screen is selected in a control area 613 as shown in a second screen 620, the preview 611 of the wallpaper of the first home screen may be displayed. When the second home screen is selected in the control area 613 as shown in a third screen 630, the preview 611 of the wallpaper of the second home screen may be displayed. When the preview is displayed on the screen, the user may be provided with visual information indicating how the wallpaper of the home screen is set.

Figure 12:
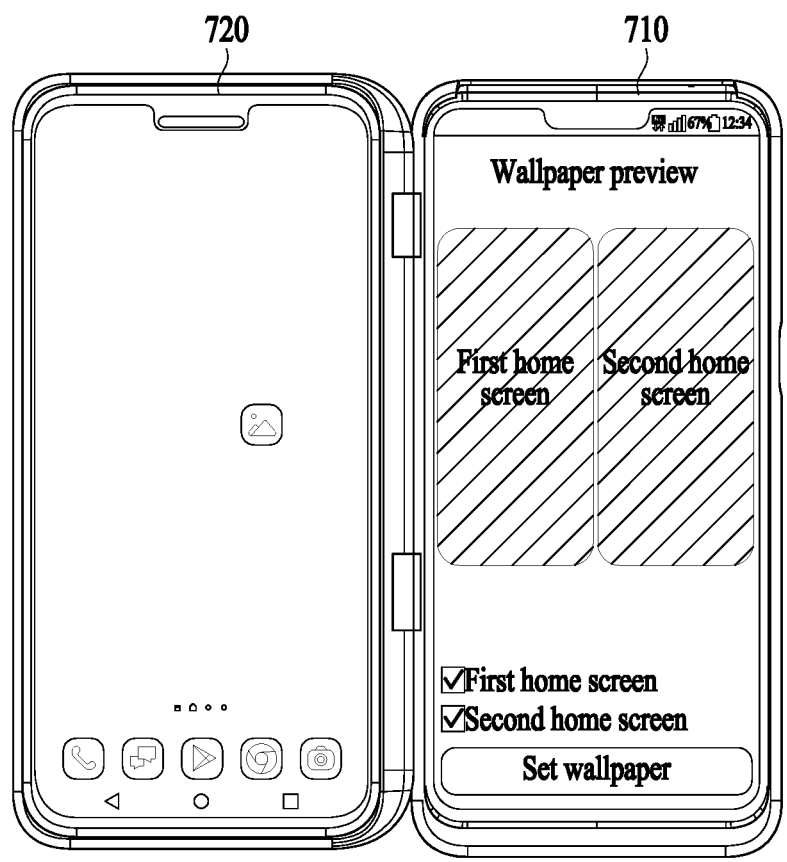
FIG. 12 is a diagram illustrating an application example of a screen displayed for setting up a home screen in an electronic device according to an example embodiment of the present disclosure.

FIG. 12 is a diagram illustrating an application example of a screen displayed for setting up a home screen in an electronic device according to an example embodiment of the present disclosure.

Specifically, FIG. 12 illustrates an example in which the screen of FIG. 11 is applied to an electronic device 700. Referring to FIG. 12, the electronic device 700 may include a first display 710 and a second display 720.

According to the example of FIG. 12, the display for setting the home screen as illustrated in FIG. 11 may be displayed on the first display 710. Thus, through the first display 710, a user may perform settings on the second home screen displayed on the second display 720 as well as settings on the first home screen displayed on the first display 710.

Figure 13:
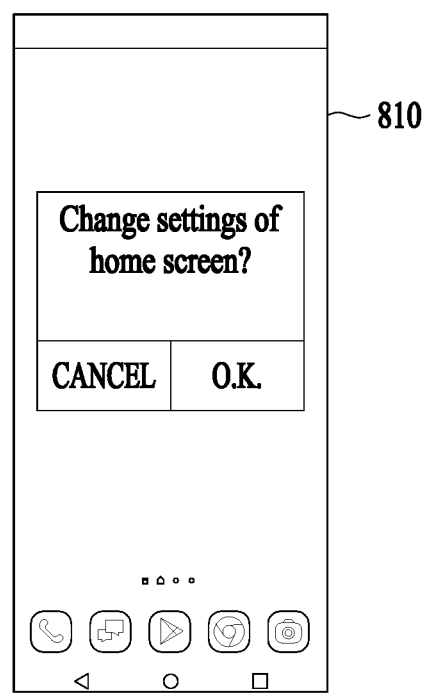
FIG. 13 is a diagram illustrating still another example of a screen displayed for setting up a home screen in an electronic device according to an example embodiment of the present disclosure.

FIG. 13 is a diagram illustrating still another example of a screen displayed for setting up a home screen in an electronic device according to an example embodiment of the present disclosure. Specifically, FIG. 13 illustrates an example of a screen displayed when an input for entering a setting control mode is received.

Referring to FIG. 13, when an input for entering a setting control mode is received, a screen 810 including a text "Change settings of a home screen?' may be provided. The screen 810 may be provided on the first display 410, and it is merely an example.

Figure 14:
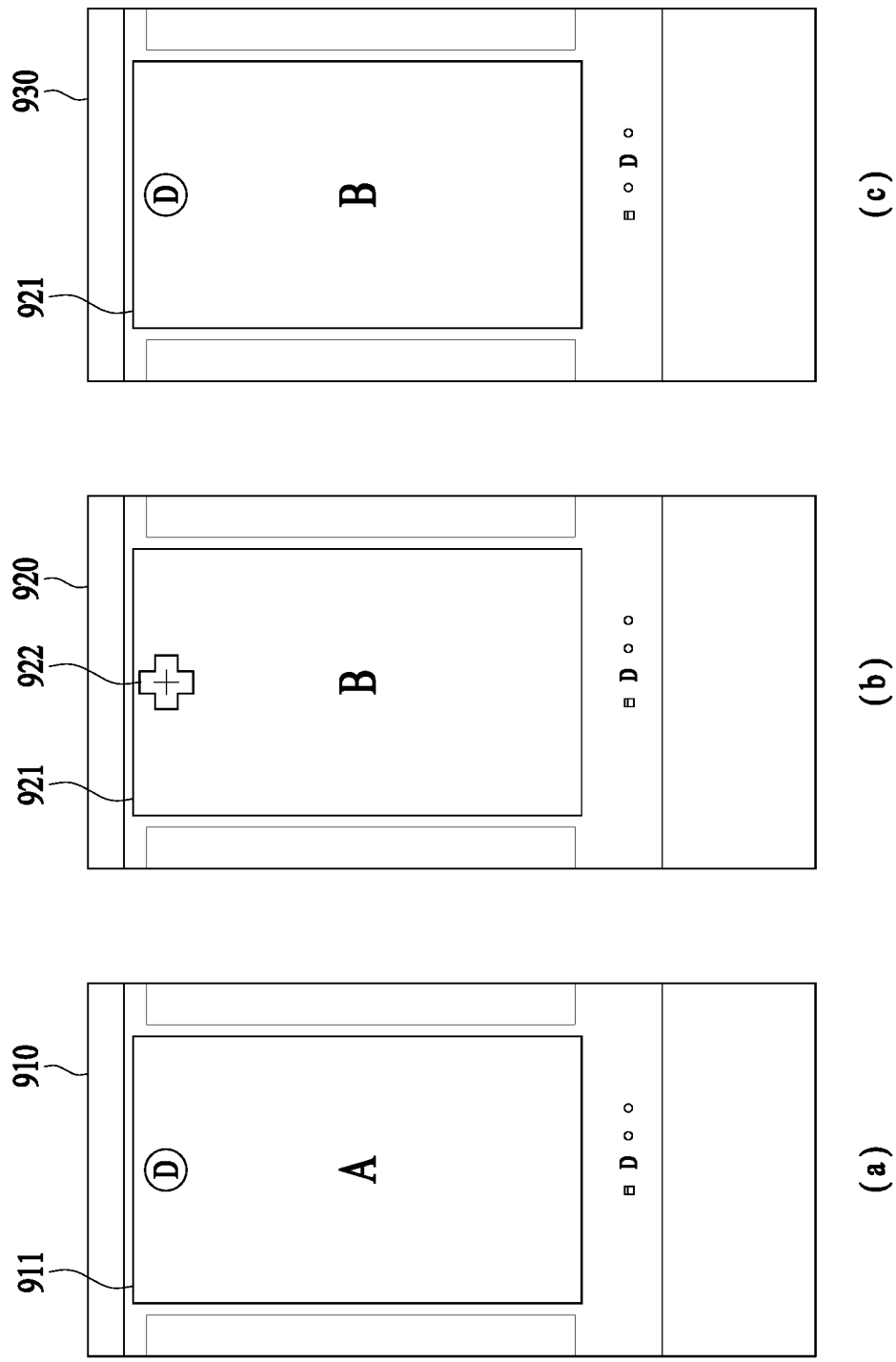
FIG. 14 is a diagram illustrating yet another example of a screen displayed for setting up a home screen in an electronic device according to an example embodiment of the present disclosure.

When an input to an area including a text "O.K." in the screen 810 is received, the controller 440 may provide at least one of screens of FIG. 14. When an input to an area including a text "CANCEL" in the screen 810 is received, the controller 440 may terminate displaying the screen 810.

Meanwhile, in some cases, a screen of FIG. 14 may be directly displayed instead of displaying the screen 810 of FIG. 13. Also, it is apparent that the screen 810 is illustrated as an example and may be configured differently therefrom.

FIG. 14 is a diagram illustrating yet another example of a screen displayed for setting up a home screen in an electronic device according to an example embodiment of the present disclosure.

Specifically, FIG. 14 illustrates examples of changing and setting a wallpaper of a first home screen and a wallpaper of a second home screen as shown in (a), (b), and (c).

Referring to FIG. 14, a first screen 910 shows a preview 911 of a wallpaper of the second home screen in detail. When an input of sliding the preview 911 leftward is received, a preview list may be moved such that a preview located in a right portion may be displayed. The preview 921 may be associated with the first home screen.

An icon 922 for setting the wallpaper of the second home screen may be located in an upper end portion of the preview 921. If an input to the icon 922 is acquired while the preview 921 of the wallpaper of the first home screen is displayed, the wallpaper of the first home screen appearing in the preview 921 may be changed to the wallpaper of the second home screen.

In this case, the existing wallpaper of the second home screen, that is, the wallpaper appearing in the preview 911 may be changed to the wallpaper of the first home screen.

The screens of FIG. 14 may be displayed on the first display 410. Accordingly, the user may more easily set the first home screen and the second home screen through a manipulation on the first display 410.

An electronic device and method according to an example embodiment of the present disclosure may allow settings of a plurality of displays (e.g., settings of a first home screen and a second home screen) to be performed through one display (e.g., the first display 410), thereby increasing ease and efficiency in setting up a display.

An electronic device and method according to an example embodiment of the present disclosure may allow settings of a plurality of displays to be performed through one display, thereby increasing usability of an electronic device related to a use of a display.

Each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

The invention claimed is:

1. An electronic device for setting up home screens of a first display and a second display, the electronic device comprising:
 a database in which information on a first home screen displayed on the first display and information on a second home screen displayed on the second display are stored; and
 a controller,
 wherein the controller is configured to:
 receive an input to enter a setting control mode for controlling settings of the home screens;
 acquire the information on the first home screen and the information on the second home screen from the database in response to the input being received;
 provide, through the first display, the information on the first home screen and the information on the second home screen in the setting control mode;
 receive a change input for changing settings of the first home screen or the second home screen based on a provision of the information on the first home screen and the information on the second home screen;
 identify a home screen related to the change input;
 store information on the change input in association with a first application in the database when the change input is related to the first home screen; and
 store information on the change input in association with a second application in the database when the change input is related to the second home screen,
 wherein the information on the first home screen is displayed on the first display, wherein the information on the second home screen is displayed on the first display, wherein the information on the first home screen is displayed simultaneously with the information on the second home screen on the first display, wherein the first home screen is displayed on the first display by the first application, and wherein the second home screen is displayed on the second display by the second application.

2. The electronic device of claim 1, wherein the controller is further configured to:

store, when the change input is related to the first home screen, the information on the change input in an area related to the first application in the database, and store, when the change input is related to the second home screen, the information on the change input in an area related to the second application in the database.

3. The electronic device of claim 1, wherein the controller is further configured to:

add, when the change input is related to the first home screen, information associated with the first application to the information on the change input and store a result of the adding in the database; and add, when the change input is related to the second home screen, information associated with the second application to the information on the change input and store a result of the adding in the database.

4. The electronic device of claim 1, wherein the controller is further configured to:

correct, when the change input is related to the first home screen, the information on the first home screen by reflecting the change input on the information on the first home screen; and correct, when the change input is related to the second home screen, the information on the second home screen by reflecting the change input on the information on the second home screen.

5. The electronic device of claim 1, wherein the second display is configured to be separable from the first display.

6. The electronic device of claim 1, wherein the input to enter the setting control mode comprises a predetermined input applied to the first display.

7. The electronic device of claim 1, wherein the information on the first home screen comprises information on at least one of a layout of the first home screen, an icon included in the first home screen, and a widget included in the first home screen, and wherein the information on the second home screen comprises information on at least one of a layout of the second home screen, an icon included in the second home screen, and a widget included in the second home screen.

8. A method of setting up home screens of a first display and a second display in an electronic device, the method comprising:

receiving an input to enter a setting control mode for controlling settings of the home screens;

acquiring information on a first home screen displayed on the first display and information on a second home screen displayed on the second display from a database in response to the input being received;

providing, through the first display, the information on the first home screen and the information on the second home screen in the setting control mode;

receiving a change input for changing settings of the first home screen or the second home screen based on a provision of the information on the first home screen and the information on the second home screen;

identifying a home screen related to the change input; and storing information on the change input in association with a first application in the database when the change input is related to the first home screen and storing information on the change input in association with a second application in the database when the change input is related to the second home screen, wherein the information on the first home screen is displayed simultaneously with the information on the second home screen on the first display, and wherein the first home screen is controlled by the first application and the second home screen is controlled by the second application.

9. The method of claim 8, wherein the storing in the database comprises:

storing, when the change input is related to the first home screen, the information on the change input in an area related to the first application in the database; and storing, when the change input is related to the second home screen, the information on the change input in an area related to the second application in the database.

10. The method of claim 8, wherein the storing in the database comprises:

adding, when the change input is related to the first home screen, information associated with the first application to the information on the change input and storing a result of the adding in the database; and adding, when the change input is related to the second home screen, information associated with the second application to the information on the change input and storing a result of the adding in the database.

11. The method of claim 8, wherein the storing in the database comprises:

correcting, when the change input is related to the first home screen, the information on the first home screen by reflecting the change input on the information on the first home screen; and correcting, when the change input is related to the second home screen, the information on the second home screen by reflecting the change input on the information on the second home screen.

12. The method of claim 8, wherein the second display is configured to be separable from the first display.

13. The method of claim 8, wherein the input to enter the setting control mode comprises a predetermined input applied to the first display.

14. The method of claim 8, wherein the information on the first home screen comprises information on at least one of a layout of the first home screen, an icon included in the first home screen, and a widget included in the first home screen, and wherein the information on the second home screen comprises information on at least one of a layout of the second home screen, an icon included in the second home screen, and a widget included in the second home screen.

* * * * *